(12) United States Patent
Wiest et al.

(10) Patent No.: US 9,140,594 B2
(45) Date of Patent: Sep. 22, 2015

(54) ULTRASONIC, FLOW MEASURING DEVICE

(75) Inventors: Achim Wiest, Weil am Rhein (DE); Andreas Berger, Hasel-Glashutten (DE)

(73) Assignee: Endress + Hauser Flowtec AG, Reinach (CH)

( * ) Notice: Subject to any disclaimer, the term of this patent is extended or adjusted under 35 U.S.C. 154(b) by 111 days.

(21) Appl. No.: 14/117,666

(22) PCT Filed: Apr. 27, 2012

(86) PCT No.: PCT/EP2012/057796
§ 371 (c)(1),
(2), (4) Date: Nov. 14, 2013

(87) PCT Pub. No.: WO2012/156196
PCT Pub. Date: Nov. 22, 2012

(65) Prior Publication Data
US 2014/0083202 A1    Mar. 27, 2014

(30) Foreign Application Priority Data
May 17, 2011    (DE) .......................... 10 2011 076 000

(51) Int. Cl.
*G01F 1/66* (2006.01)
(52) U.S. Cl.
CPC ................ *G01F 1/662* (2013.01); *G01F 1/667* (2013.01)
(58) Field of Classification Search
CPC ........................................................ G01F 1/66
USPC .............................. 73/861.27, 861.28, 861.29
See application file for complete search history.

(56) References Cited

U.S. PATENT DOCUMENTS 4,109,523 A * 8/1978 Teyssandier ............... 73/861.31
4,300,401 A   11/1981 Pedersen
(Continued)

FOREIGN PATENT DOCUMENTS

DE          1255094       11/1967
DE       29719677 U1      1/1999
(Continued)

OTHER PUBLICATIONS

Nov. 28, 2013 English Translation of IPR, WIPO, Geneva, Switzerland.
(Continued)

*Primary Examiner* — Jewel V Thompson
(74) *Attorney, Agent, or Firm* — Bacon & Thomas, PLLC (57) ABSTRACT

An ultrasonic, flow measuring device, which includes a measuring tube having a straight measuring tube axis, a transmitter for sending an acoustic signal on a first signal path, a receiver for receiving the acoustic signal on the first signal path and at least a first reflection surface, on which the acoustic signal is reflected at least once on the first signal path. The acoustic signal incident on the first reflection surface propagates along a first straight subsection, which has a first separation from the measuring tube axis, wherein the transmitter, the receiver and the first reflection surface are so oriented relative to one another and arranged in or on the measuring tube that the acoustic signal on the first signal path from the first transmitter to the first receiver is so reflected on the at least a first reflection surface that the acoustic signal reflected on the first reflection surface propagates through the measuring tube on the first signal path along a second straight subsection. A surface normal to the first reflection surface has an angle relative to the measuring tube axis, which is other than 90°.

16 Claims, 4 Drawing Sheets

(56) References Cited

U.S. PATENT DOCUMENTS

| | | | |
|---|---|---|---|
| 5,228,347 A * | 7/1993 | Lowell et al. | 73/861.28 |
| 5,437,194 A * | 8/1995 | Lynnworth | 73/861.27 |
| 5,546,812 A * | 8/1996 | Drenthen | 73/861.29 |
| 6,098,466 A | 8/2000 | Shkarlet | |
| 7,810,399 B2 | 10/2010 | van Klooster et al. | |
| 2007/0079660 A1 | 4/2007 | Feller | |
| 2011/0277558 A1* | 11/2011 | Dietz et al. | 73/861.31 |

FOREIGN PATENT DOCUMENTS

| | | |
|---|---|---|
| DE | 19808642 C1 | 8/1999 |
| DE | 102007004936 B4 | 6/2008 |
| EP | 0715155 A1 | 6/1996 |
| EP | 1255094 A2 | 11/2002 |
| WO | 9512110 A1 | 5/1995 |
| WO | 2012156196 A1 | 11/2012 |

OTHER PUBLICATIONS

Oct. 5, 2012 International Search Report, EPO, The Netherlands.

Feb. 28, 2012 German Search Report, German Patent Office, Munich, Germany.

Oct. 12, 2012 International Search Report, EPO, The Netherlands.

* cited by examiner

ULTRASONIC, FLOW MEASURING DEVICE

TECHNICAL FIELD

The present invention relates to an ultrasonic, flow measuring device for flow measurement and includes a measuring tube having a straight measuring tube axis, a transmitter for sending an acoustic signal on a first signal path, a receiver for receiving the acoustic signal on the first signal path, and a first reflection surface, on which the acoustic signal on the first signal path is reflected, wherein the acoustic signal incident on the first reflection surface propagates along a first line, which has a first separation from the measuring tube axis.

BACKGROUND DISCUSSION

Ultrasonic, flow measuring devices are applied widely in process and automation technology. They permit easy determination of volume flow and/or mass flow in a pipeline.

Known ultrasonic, flow measuring devices frequently work according to the travel-time difference principle. In the travel-time difference principle, the different travel times of ultrasonic waves, especially ultrasonic pulses, i.e. so-called bursts, are evaluated as a function of the direction the waves travel in the flowing liquid. To this end, ultrasonic pulses are sent at a certain angle to the tube axis both with, as well as also counter to, the flow. From the travel-time difference, the flow velocity, and therewith, in the case of known diameter of the pipeline section, the volume flow, can be determined.

The ultrasonic waves are produced, respectively received, with the assistance of so-called ultrasonic transducers. To this end, ultrasonic transducers are placed securely in the tube wall of the relevant pipeline section. There are also clamp on, ultrasonic, flow measuring systems. In such case, the ultrasonic transducers are pressed externally on the wall of the measuring tube. A great advantage of clamp on, ultrasonic, flow measuring systems is that they do not contact the measured medium and can be placed on an already existing pipeline.

The ultrasonic transducers are normally composed of an electromechanical transducer element, e.g. a piezoelectric element, and a coupling layer. In the electromechanical transducer element, the ultrasonic waves are produced as acoustic signals and led via the coupling layer to the pipe wall and from there into the liquid in the case of clamp-on-systems, and, in the case of inline systems, via the coupling layer into the measured medium. In such case, the coupling layer is sometimes called a membrane.

Between the piezoelectric element and the coupling layer, another coupling layer can be arranged, a so called adapting, or matching, layer. The adapting, or matching, layer performs, in such case, the function of transmitting the ultrasonic signal and simultaneously reducing reflection at interfaces between two materials caused by different acoustic impedances.

Both in the case of clamp-on-systems, as well as also in the case of inline systems, the ultrasonic transducers are arranged on the measuring tube in a shared plane, either on oppositely lying sides of the measuring tube, in which case the acoustic signal, projected onto a tube cross section, passes once along a secant through the measuring tube, or on the same side of the measuring tube, in which case the acoustic signal is reflected on the oppositely lying side of the measuring tube, whereby the acoustic signal traverses the measuring tube twice along the secant projected on the cross section through the measuring tube. U.S. Pat. No. 4,103,551 and U.S. Pat. No. 4,610,167 show ultrasonic, flow measuring devices with reflections on reflection surfaces provided therefor in the measuring tube. Also known are multipath systems, which have a number of ultrasonic transducer pairs, which, in each case, form a signal path, along which the acoustic signals pass through the measuring tube. The respective signal paths and the associated ultrasonic transducers lie, in such case, in mutually parallel planes parallel to the measuring tube axis. U.S. Pat. No. 4,024,760 and U.S. Pat. No. 7,706,986 show such multipath systems by way of example. An advantage of multipath systems is that they can measure the profile of the flow of the measured medium in the measuring tube at a plurality of locations and thereby provide highly accurate, measured values for the flow. This is achieved based on, among other things, the fact that the individual travel times along the different signal paths are weighted differently. Disadvantageous in the case of multipath systems is, however, their manufacturing costs, since several ultrasonic transducers and, in given cases, a complex evaluating electronics need to be used.

There are different approaches for weighting the signal paths. The paper "Comparsion of integration methods for multipath accoustic discharge measurements" by T. Tresch, T. Staubli and P. Gruber in the handout for 6th International Conference on Innovation in Hydraulic Efficiency Measurements, 30 Jul.-1 Aug. 2006 in Portland, Oreg., USA, compares established methods for weighting the travel times along different signal paths for calculating the flow.

WO 1995012110 A1 discloses an ultrasonic, flow measuring device having a measuring tube with planar walls and a straight measuring tube axis and at least one reflection surface in the measuring tube, wherein a normal to this reflection surface has three components different from zero in a right angled coordinate system, whose one axis corresponds to the measuring tube axis. This document teaches that an ultrasonic signal of predetermined width, which is markedly greater than a point shaped signal, has a Gauss shaped sensitivity across this width. This signal is used for flow measurement. The width of the signal corresponds, in such case, approximately to the width of the rectangular measuring tube. If such a signal would pass through the measuring tube parallel to the side walls, the region with the highest sensitivity would extend through the center region of the measuring tube, and, thus, also record the higher flow velocities with higher values. In the case of very small flow velocities, this would lead to a measurement error. The document teaches consequently, further, to irradiate the measuring tube largely homogeneously by leading the ultrasonic signals through all regions of the measuring tube by means of directed reflections. For illustration, the broad ultrasonic signal was represented by individual beam portions. The path lengths of the individual beam portions are equally long, so that the beam portions do not cancel by interference.

SUMMARY OF THE INVENTION

An object of the invention is to provide an ultrasonic, flow measuring device, which ascertains flow highly accurately and also is cost effective to manufacture.

The object is achieved by an ultrasonic, flow measuring device, which includes for flow measurement a measuring tube having a straight measuring tube axis, at least a first transmitter for sending an acoustic signal on a first signal path, at least a first receiver for receiving the acoustic signal on the first signal path and at least a first reflection surface, wherein the transmitter, the receiver and the first reflection surface are so oriented with respect to one another and arranged in or on the measuring tube that the acoustic signal on the first signal path from the first transmitter to the first receiver is so reflected on the at least a first reflection surface that the acoustic signal passes on the first signal path through the measuring tube along at least a first and at least one additional, second, straight subsection, wherein the first straight subsection has a first separation from the measuring tube axis and the second straight subsection has a second separation from the measuring tube axis, wherein the first separation is different from the second separation, and wherein the sum of all lengths of all subsections of the first signal path as projected on the measuring tube axis and having the first separation from the measuring tube axis has a predetermined first value and wherein the sum of all lengths of all subsections of the first signal path as projected on the measuring tube axis and having the second separation from the measuring tube axis has a predetermined second value, wherein the first value is different from the second value, and wherein the first and the second values are other than zero. Especially, the acoustic signal incident on the first reflection surface passes along the first straight subsection and the acoustic signal reflected on the first reflection surface passes along the second straight subsection. The first reflection surface is correspondingly arranged in the measuring tube. A surface normal to the first reflection surface does not, in such case, intersect the measuring tube axis perpendicularly. If the surface normals to the first reflection surface and the measuring tube axis are considered as vectors, their scalar product is other than zero. If two lines in space intersect, the smallest angle at their intersection is the angle of intersection, which here is other than 90°.

Serving both as transmitter as well as also receiver are usually ultrasonic transducers, especially electromechanical transducers, e.g. piezoelectric elements, which are suitable to send as well as also to receive the acoustic signal, especially an ultrasonic pulse or one or more ultrasonic waves. If ultrasonic transducers are applied as transmitters and receivers, the acoustic signal can pass along the first signal path back and forth, thus in two directions. Transmitter and receiver are, thus, exchangeable.

In an embodiment of the invention, the transmitter is suitable for receiving an acoustic signal on the first signal path and the receiver is suitable for sending the acoustic signal on the first signal path. The transmitter and receiver are ultrasonic transducers, especially ultrasonic transducers with electromechanical transducer elements, e.g. piezoelectric transducer elements.

Referred to as signal path, also called acoustic path, is the path of the acoustic signal, thus e.g. the ultrasonic wave or the ultrasound pulse, between the transmitter, which transmits the acoustic signal, and the receiver, which receives the acoustic signal. In an embodiment of the invention, the acoustic signal is, such as usual in the case of an inline system, radiated perpendicularly to the membrane. The receiver is then so emplaced in or on the measuring tube that the signal, in turn, strikes perpendicularly on its membrane.

Used as an acoustic signal is especially a sound wave or a packet of sound waves. Serving as reflection surface is an interface, e.g. one formed between measured medium and measuring tube or a reflector arranged on or in the measuring tube. In an embodiment of the invention, the reflection surface is a surface of a reflector separately arranged in the measuring tube and contacting the measured medium during operation of the ultrasonic, flow measuring device.

In an embodiment of the invention, the acoustic signal is transmitted perpendicularly to a membrane of a first ultrasonic transducer serving as transmitter and received perpendicularly to a membrane of a second ultrasonic transducer serving as receiver, wherein the two ultrasonic transducers are so oriented relative to the reflection surface that the acoustic signal is reflected on the reflection surface to the second ultrasonic transducer.

The orientation of the reflection surface occurs e.g. via angle bisector between the acoustic signal incident along the first line on the first signal path and the acoustic signal reflected along the second line on the first signal path. The angle bisector is the normal to the reflection surface. In an embodiment of the invention, the normal to the reflection surface does not intersect the measuring tube axis perpendicularly.

The separation of two lines is defined here as usual in mathematics. If two lines are skew to one another in space, the separation of the one line to an auxiliary plane parallel to it is calculated, in which plane the other line lies.

Two lines, which are not coincident, always have a separation relative to one another. This is measured by the length of the normal between the two lines, which is perpendicular to both lines. Even for lines skewed to one another, a normal exists. Therefore, a plane can be constructed, in which one line lies, and which is parallel to the other line. Thus, a first plane can be constructed, in which the first line lies and which is parallel to the measuring tube axis. Analogously, there exists a second plane parallel to the measuring tube axis in which the second line lies. According to the invention, the acoustic signal on the first signal path is reflected on the first reflection surface, wherein the acoustic signal incident on the first reflection surface propagates along the first straight subsection in a first plane parallel to the measuring tube axis, which first plane has the first separation from the measuring tube axis, and wherein the acoustic signal reflected on the first reflection surface propagates along the second straight subsection in a second plane parallel to the measuring tube axis, which second plane has the second separation from the measuring tube axis. The first plane would be tangent to a first straight circular cylinder with the first separation as radius of its base, along a line parallel to the measuring tube axis, which is part of its lateral surface, exactly as the second plane would be tangent to a second straight circular cylinder with the second separation as radius of its base. Both planes intersect in a line of intersection extending parallel to the measuring tube axis. The line of intersection lies, in such case, especially in the region of the first reflection surface. In the model on which this is based, the acoustic signals propagate along straight subsections. Therefore, the line of intersection of the first straight subsection and the second straight subsection would intersect the point of reflection of the acoustic signal on the first signal path on the reflection surface. Naturally, this is a model. In practice, the first signal path is not just a point wide and therefore the point of reflection is rather an area in the region of the reflection surface.

In a first embodiment of the invention, the measuring tube has an elliptical, especially circular, cross section, wherein the measuring tube axis then can also be referred to as the principal-, central- or longitudinal axis. The principal flow direction of the medium in the measuring tube coincides with the measuring tube axis.

In an additional embodiment of the invention, both the first separation as well as also the second separation is other than zero. In an additional embodiment, the dimensions of the measuring tube are a multiple of the dimensions of the ultrasonic transducer, respectively the transmitter and/or receiver. Thus, in the case of a round measuring tube and disk shaped transmitters and/or receivers, the diameter of the measuring tube is at least two times, especially five times, especially at least ten times, greater than the diameter of the disk of the transmitters and/or receivers. If the measuring tube has, for example, an angular, especially rectangular, especially square cross section, and/or the ultrasonic transducers as transmitter and/or receiver have some different shape, such as e.g. likewise rectangular, then the surface area of the cross section of the lumen of the measuring tube is at least four times greater than the surface area of the ultrasonic transducer, or even 25 times or even at least 100 times greater.

In an embodiment of the ultrasonic, flow measuring device of the invention, a travel-time difference method is used for flow measurement. The ultrasonic, flow measuring device of the invention is embodied correspondingly suitable therefor.

In an additional, further development of the invention, the first separation is less than the second separation and the sum of all values of the lengths of all subsections of the first signal path as projected on the measuring tube axis and having the first separation from the measuring tube axis is greater than the sum of all values of the lengths of all subsections of the first signal path as projected on the measuring tube axis and having the second separation from the measuring tube axis. The signal on the first signal path has a directional component in, or counter to, the direction of the measuring tube axis.

In an additional, further development of the invention, the summing of all values of the lengths of all subsections of the first signal path as projected on the measuring tube axis and having the same separation from the measuring tube axis is accomplished with a shared, predetermined, especially steady, calculational formula as a function of such separation. For example, the summing of all values of the lengths of all subsections of the first signal path as projected on the measuring tube axis and having the same separation from the measuring tube axis is accomplished proportionally to weighting factors for weighting the travel time of the acoustic signal along a measuring path with the same separation from the measuring tube axis of an analog multipath, ultrasonic, flow measuring device with a plurality of measuring paths with the same distances as the different subsections of the first signal path from the measuring tube axis. If the measuring paths of the multipath, ultrasonic, flow measuring device have the same angle to the measuring tube axis, the weighting factors are calculated, for example, according to the Gauss-Jacobi or the OWICS method, such as they are described in the dissertation of A. Voser: "Analyse and Fehleroptimierung der mehrpfadigen akustischen Durchflussmessung in Wasserkraftanlagen (ANALYSIS AND ERROR OPTIMIZING OF MULTIPATH, ACOUSTIC, FLOW MEASUREMENT IN HYDROPOWER PLANTS)", ETH Zurich Dissertation No. 13102, 1999, as a function of the respective separations from the measuring tube axis. Analogously, the subsections have predetermined lengths, which are so dimensioned that the summing of all values of the lengths of all subsections of the first signal path as projected on the measuring tube axis and having the same separation from the measuring tube axis is accomplished proportionally to the weighting factors of an analog multipath, ultrasonic, flow measuring device.

An ultrasonic, flow measuring device of the invention is manufactured, for example, with the method described in an additional patent application with the title "ULTRASONIC, FLOW MEASURING DEVICE" filed simultaneously with this patent application by the same applicant, to which reference is made herewith. An ultrasonic, flow measuring device of the invention, is, thus, obtainable using the manufacturing process of the invention.

In an additional, further development of the invention, the first subsection and the second subsection are skew to one another in the measuring tube.

In an additional, further development of the invention, the ultrasonic, flow measuring device includes at least one other, second reflection surface, wherein the transmitter, the receiver and the first reflection surface and the at least one other, second reflection surface are so oriented relative to one another and arranged in or on the measuring tube that the acoustic signal on the first signal path from the first transmitter is so reflected on the first and on the at least one additional, second reflection surface to the first receiver that the acoustic signal travels on the first signal path along at least one additional, third, straight subsection through the measuring tube, wherein the third straight subsection has a third separation from the measuring tube axis, wherein the third separation is different from the first and the second separation, and wherein the sum of all lengths of all subsections of the first signal path as projected on the measuring tube axis and having the third separation from the measuring tube axis has a predetermined third value, which is different from the first value and different from the second value, and wherein the third value is other than zero.

In an additional, further development of the invention, the ultrasonic, flow measuring device includes at least one additional, second transmitter for sending an acoustic signal on a second signal path, and at least one additional, second receiver for receiving an acoustic signal on the second signal path and at least one other, third reflection surface, wherein the second transmitter, the second receiver and the at least one other, third reflection surface are so oriented relative to one another and arranged in or on the measuring tube that the acoustic signal on the second signal path from the second transmitter is so reflected on the at least one additional, third reflection surface to the second receiver that the acoustic signal on the second signal path travels along at least a fourth and at least a fifth straight subsection through the measuring tube, wherein the fourth straight subsection has a fourth separation from the measuring tube axis and the fifth straight subsection has a fifth separation from the measuring tube axis, wherein the fourth separation is different from the fifth separation, and wherein the sum of all lengths of all subsections of the second signal path as projected on the measuring tube axis and having the fourth separation from the measuring tube axis has a predetermined fourth value and wherein the sum of all lengths of all subsections of the second signal path as projected on the measuring tube axis and having the fifth separation from the measuring tube axis has a predetermined fifth value, wherein the fourth value is different from the fifth value, and wherein the fourth and fifth values are other than zero.

In an additional, further development of the invention, the ultrasonic, flow measuring device includes at least one other, fourth reflection surface, wherein the second transmitter, the second receiver and the third reflection surface and the at least one other, fourth reflection surface are so oriented relative to one another and arranged in or on the measuring tube that the acoustic signal on the second signal path from the second transmitter to the third and to the at least one additional, fourth reflection surface is so reflected to the second receiver that the acoustic signal travels on the second signal path along at least one additional, sixth straight subsection through the measuring tube, wherein the sixth straight subsection has a sixth separation from the measuring tube axis, wherein the sixth separation differs from the fourth and fifth separations, and wherein the sum of all lengths of all subsections of the second signal path as projected on the measuring tube axis and having the sixth separation from the measuring tube axis has a predetermined sixth value, which differs from the fourth value and from the fifth value, and wherein the sixth value is other than zero.

In an additional, further development of the invention, the first signal path and the second signal path extend in the measuring tube as mirror images of one another.

In a further developed ultrasonic, flow measuring device, the first transmitter, the first receiver and the first reflection surface are so oriented relative to one another and arranged in or on the measuring tube that the acoustic signal on the first signal path from the first transmitter to the first receiver propagates helically around the measuring tube axis. Also, the second transmitter and receiver and the second reflection surface can be so oriented relative to one another and arranged in or on the measuring tube that the second signal path, analogously to the first signal path, winds helically around the measuring tube axis.

In the case of the method of the invention for measuring the flow of a medium through a measuring tube with an essentially straight measuring tube axis according to the travel-time difference method, at least one acoustic signal is transmitted from at least a first transmitter on a first signal path to at least a first receiver, wherein the acoustic signal on the first signal path from the transmitter to the receiver is so reflected on at least a first reflection surface through the measuring tube to a first receiver that the acoustic signal on the first signal path propagates along at least a first and at least a second straight subsection through the measuring tube, wherein the first straight subsection has a first separation from the measuring tube axis and wherein the second straight subsection has a second separation from the measuring tube axis, wherein the first separation is different from the second separation, and wherein the sum of all lengths of all subsections of the first signal path as projected on the measuring tube axis and having the first separation from the measuring tube axis has a predetermined first value and wherein the sum of all lengths of all subsections of the first signal path as projected on the measuring tube axis and having the second separation from the measuring tube axis has a predetermined second value, wherein the first value differs from the second value, and wherein the first and second values are other than zero.

In such case, pairs of subsections of the first signal path, especially pairs with the same separation from the measuring tube axis and therewith the same length projected on the measuring tube axis, can lie opposite one another as mirror images in the measuring tube. An advantage of this embodiment is that no second signal path is necessary, in order to obtain a similar measuring power.

Naturally, however, also a second acoustic signal on a second signal path from a second transmitter can be so reflected on at least one additional, third reflection surface through the measuring tube to a second receiver that the acoustic signal propagates on the second signal path through the measuring tube along at least a fourth and at least a fifth straight subsection, wherein the fourth straight subsection has a fourth separation from the measuring tube axis and wherein the fifth straight subsection has a fifth separation from the measuring tube axis, wherein the fourth separation is different from the fifth separation, and wherein the sum of all lengths of all subsections of the second signal path as projected on the measuring tube axis and having the fourth separation from the measuring tube axis has a predetermined fourth value and wherein the sum of all lengths of all subsections of the second signal path as projected on the measuring tube axis and having the fifth separation from the measuring tube axis has a predetermined fifth value, wherein the fourth value differs from the fifth value, and wherein the fourth and fifth values are other than zero.

In such case, the first and second signal paths can lie opposite one another as mirror images in the measuring tube, wherein then the two are equally weighted in the calculating of flow.

Alternatively, the two signal paths extend so in the measuring tube that the first and second signal paths can be made to coincide by rotation of one about the measuring tube axis. They are displaced from one another by a predetermined angle about the measuring tube axis In the case of increasing flow velocities, dispersions of the ultrasonic signal of the ultrasonic, flow measuring device can occur, which leads to a lessening of the signal strength. This effect can advantageously be corrected by one or more concave mirrors.

All embodiments can, unless stated to the contrary, be combined with one another.

BRIEF DESCRIPTION OF THE DRAWINGS

The invention permits numerous forms of embodiment. Some thereof will now be explained in greater detail based on the drawing. Equal elements are provided in the figures of the drawing with equal reference characters. The figures of the drawing show as follows.

DETAILED DISCUSSION IN CONJUNCTION WITH THE DRAWINGS

Figure 1A:
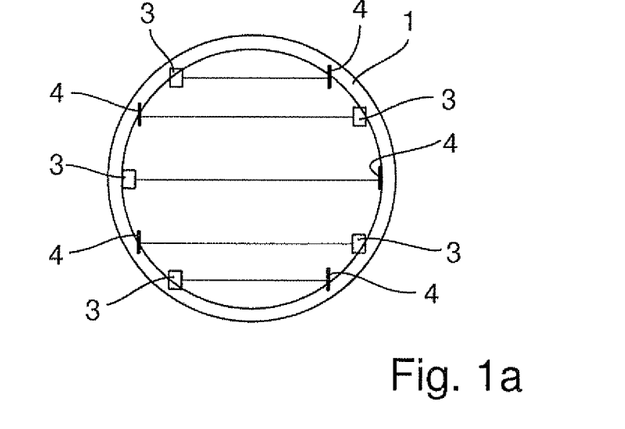
FIG. 1 is a multipath, ultrasonic, flow measuring device of the state of the art.
Figure 1B:
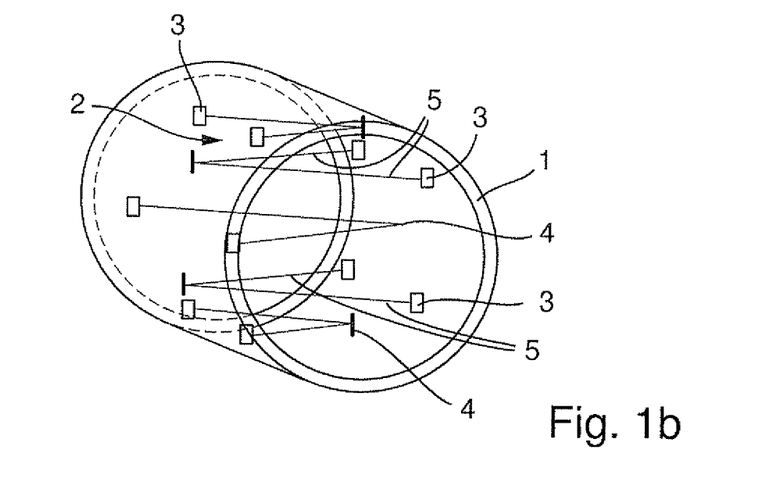

FIG. 1a shows a multipath, ultrasonic, flow measuring device of the state of the art in cross section through the measuring tube 1. FIG. 1b shows the same multipath, ultrasonic, flow measuring device perspectively. Both figures are taken from DE 10 2007 004 936 B4. The multipath, ultrasonic, flow measuring device includes, in such case, a measuring tube 1 and ten ultrasonic transducers 3, which together with five ultrasonic reflectors 4, form five V-shaped signal paths 5. In each case, two ultrasonic transducers 3 form an ultrasonic transducer pair 2. Each of the five V-shaped signal paths 5 is formed of two straight subsections, a first straight subsection from the first ultrasonic transducer 3 of its ultrasonic transducer pair 2 to the associated ultrasound reflector 4 and a second straight subsection from the associated ultrasound reflector 4 to the second ultrasonic transducer 3 of its ultrasonic transducer pair 2. Each of these ultrasonic transducer pairs 2 lies with the associated ultrasound reflector 4 in a plane, which has a predetermined separation from the measuring tube axis. Also, the two straight subsections of the respective V-shaped signal paths 5 lie in these, thus, five planes, which are spanned by the five V-shaped signal paths 5, and the five planes extend parallel to one another in the measuring tube.

Figure 2:
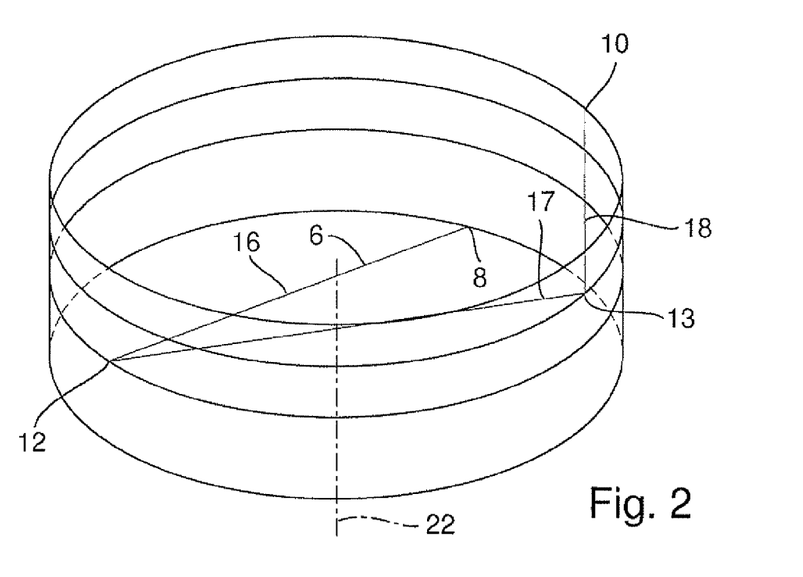
FIG. 2 shows perspectively, an ultrasonic, flow measuring device of the invention.

FIG. 2 provides a strongly simplified model of the operation of an ultrasonic, flow measuring device of the invention. Shown are a measuring tube 1 and a first signal path 6. Indication of the ultrasonic transducers (transmitter and/or receiver) and the reflection surfaces has been omitted for reasons of perspicuity. Instead, as a simplification, only the intersections of the first signal path 6 with the measuring tube 1 at the effective locations of the transducers and reflectors are shown. Thus, the first transmitter 8 sends the acoustic signal on the first signal path 6 in the direction of the first reflection surface 12 along a first straight subsection 16. On the first reflection surface 12, the acoustic signal on the first signal path 6 is reflected toward the second reflection surface 13 along a second straight subsection 17, where it, finally, is reflected on a third straight subsection 18 of the first signal path 6 toward the first receiver 10. The first transmitter 8 lies, in such case, in a first plane perpendicular to the measuring tube axis 22. The first reflection surface 12 lies in a second plane perpendicular to the measuring tube axis 22. The second reflection surface 13 lies in a third plane perpendicular to the measuring tube axis 22, and the first receiver 10 lies in a fourth plane perpendicular to the measuring tube axis 22. The planes are, for reasons of simplicity, not sketched. Shown, however, are their circles of intersection with the measuring tube 1, on which circles of intersection lie, respectively, the first transmitter 8, the first receiver 10 and the first reflection surface 12 and the second reflection surface 13, respectively here in this model the intersections of the first signal path 6 with the measuring tube 1. The four parallel planes have predetermined distances from one another. Thus, the first subsection 16 has a first length with a value other than zero as projected on the measuring tube axis 22, while likewise the second and third subsections 17 and 18 have respectively second and third lengths projected on the measuring tube axis 22, which correspond to the separations of the planes.

Figure 3:
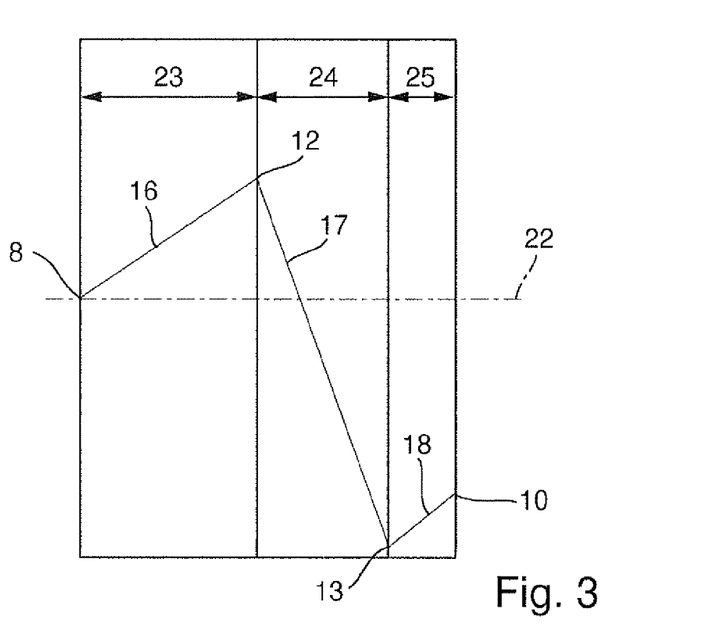
FIG. 3 is an ultrasonic, flow measuring device of the invention in longitudinal section.

The lengths of the subsections projected on the measuring tube axis 22 are shown in FIG. 3, which is a longitudinal section through the measuring tube 1. The acoustic signal on the first signal path experiences between the first transmitter 8 and the first receiver 10 two reflections, namely a first on the first reflection surface 12 and a second on the second reflection surface 13. Thus, the first signal path can be divided into three straight subsections 16, 17 and 18. Each of these has a length projected onto the measuring tube axis 22. The values of these lengths in this example of an embodiment are always other than zero. The first straight subsection 16 has a first length 23, the second subsection 17 a second length 24 and the third straight subsection 18 a third length 25, all as projected on the measuring tube axis 22.

The values of these lengths 23, 24 and 25 are according to the invention dependent on the respective separations of the respective straight subsection 16, 17 and 18 from the measuring tube axis 22. Here, the first value of the first length 23 is greater than the second value of the second length 24, which, in turn, is greater than the third value of the third length 25.

Figure 4:
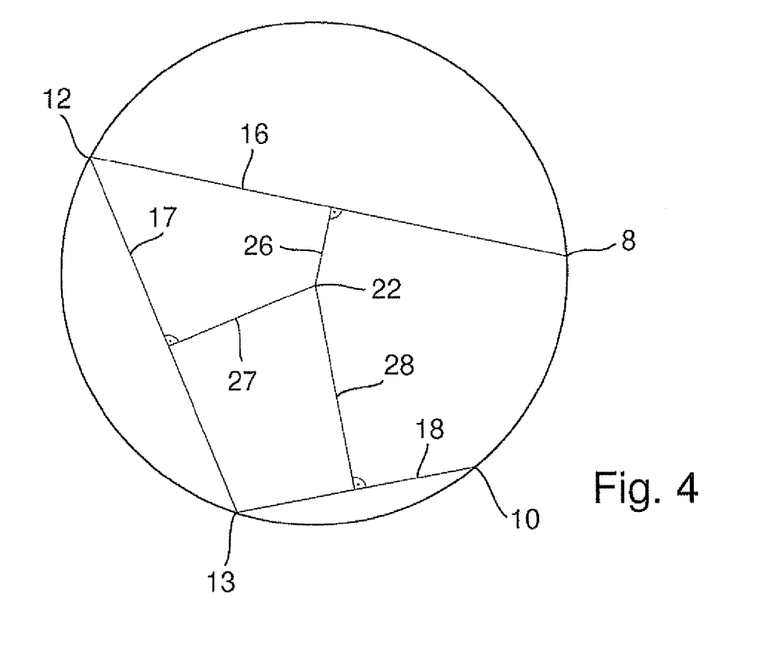
FIG. 4 is an ultrasonic, flow measuring device of the invention in cross section.

FIG. 4 shows the separations 26, 27 and 28 of each subsection 16, 17 and 18 from the measuring tube axis 22. The first straight subsection 16 of the first signal path between first transmitter 8 and the first reflection surface 12 has a first separation 26 from the measuring tube axis. The second straight subsection 17 of the first signal path between the first reflection surface 12 and the second reflection surface 13 has a second separation 27 from the measuring tube axis. The third straight subsection 18 of the first signal path between second reflection surface 13 and first receiver 10 has a third separation 28 from the measuring tube axis. The distances 26, 27 and 28 are measured according to custom via the normals to the straight subsections, which normals intersect the measuring tube axis 22.

All these distances 26, 27 and 28 have in this example of an embodiment values that are other than zero. However, an option is that one or more straight subsections intersect the measuring tube axis. The values of the distances 26, 27 and 28 are here differently large. Here, the first value of the first distance 26 is less than the second value of the second separation 27, which, in turn, is less than the third value of the third distance 28. The separation values yield the differently large values of the lengths of the subsections projected on the measuring tube axis 22, such as explained with reference to FIG. 3.

Figures 6, 7:
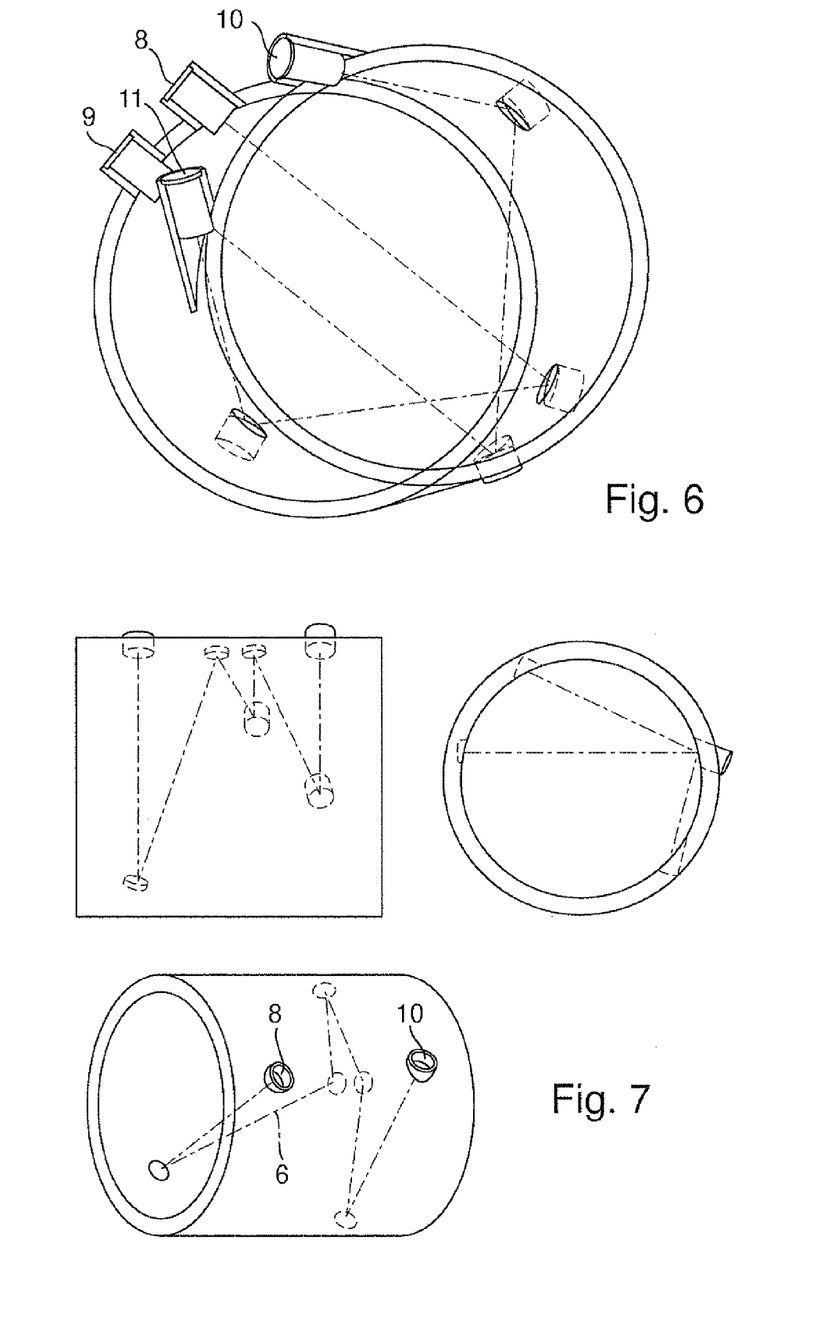
FIG. 6 shows perspectively, an ultrasonic, flow measuring device of the invention in an additional embodiment.
FIG. 7 shows perspectively, an ultrasonic, flow measuring device of the invention in an additional embodiment both in longitudinal, as well as also in cross, section.

In the preceding example of an embodiment, all subsections of the first signal path have a length with a value other than zero as projected on the measuring tube axis. However, also ultrasonic, flow measuring devices of the invention can be manufactured, which have one or more subsections of the first signal path with a value of length projected on the measuring tube axis 22 equal to zero. FIG. 7 shows one of these ultrasonic, flow measuring devices of the invention, again, perspectively, in longitudinal, and in cross, section.

Figure 5:
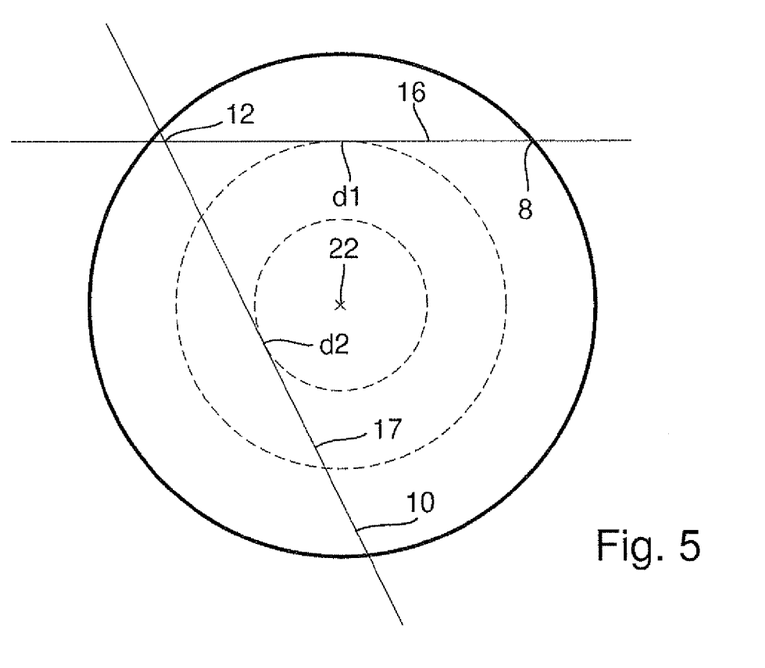
FIG. 5 is an ultrasonic, flow measuring device of the invention in an additional embodiment in cross section.

However, first the measuring method of the invention will be described in greater detail based on FIG. 5. FIG. 5 shows a cross section of a measuring tube 1. Two lines intersect the circumferences of radii d1 and d2 around the measuring tube axis 22, which points into the plane of the drawing. Furthermore, the lines intersect the measuring tube 1 at the points 8, 10 and 12, which here, again, represent the first transmitter 8, the first receiver 10 and the first reflection surface 12. These points limit the first and second straight subsections 16 and 17, which coincide with the lines. Thus, the first straight subsection 16 has the separation of value d1 from the measuring tube axis and the second straight subsection 17 has the separation of value d2 from the measuring tube axis, wherein, in this example of an embodiment, d1>d2. Each of the straight subsections 16 and 17 lies in a plane parallel to the measuring tube axis. Both planes extend likewise into the plane of the drawing and are therefore only shown by the two lines.

Compared with a multipath, ultrasonic, flow measuring device, such as, for example, that shown in FIG. 1, parallels and differences will now be explained. The individual signal paths (also called measuring paths) of the multipath, ultrasonic, flow measuring device of FIG. 1 lie in planes parallel to one another and to the measuring tube axis and have, in each case, a certain distance from the measuring tube axis. Also the subsections of the first signal path lie in planes parallel to the measuring tube axis, however, these planes intersect in the region of the first reflection surface. Thus, two secants through the measuring tube can be mapped with only a single signal path.

With the travel-time difference method, flow velocities of a fluid flowing through the measuring tube are measured. The flow profile of the fluid is dependent on, among other things, the flow velocity and viscosity of the fluid. In order to register the flow in the case of a multipath, ultrasonic, flow measuring device, a number of flow velocities at a plurality of measuring tube locations are measured with a plurality of measuring paths and taken into consideration, in order to register the flow profile as accurately as possible. The invention now permits registering the flow profile analogously and equally valued, but with an essentially smaller number of ultrasonic transducers as transmitter and/or receiver being needed.

An acoustic signal is transmitted by the first transmitter 8 on the first signal path to the first receiver 10, wherein the acoustic signal on the first signal path from the first transmitter to the first receiver is so reflected on the first reflection surface 12 through the measuring tube that the acoustic signal propagates through the measuring tube on the first signal path along the first straight subsection 16 and on the second straight subsection 17, wherein the first straight subsection 16 has the first separation d1 from the measuring tube axis 22 and wherein the second straight subsection 17 has the second separation d2 from the measuring tube axis 22.

FIG. 6 shows an ultrasonic, flow measuring device of the invention with two signal paths and, consequently, two sets of transmitters and receivers. Besides the first transmitter 8 and the first receiver 10, there are now a second transmitter and a second receiver 11 arranged in bores in the measuring tube 1. The signal of the first signal path leads from the first transmitter 8 to the first reflection surface 12, where it is reflected to the second reflection surface 13, and is there, in turn, reflected to the first receiver 10. Analogously, the acoustic signal moves along the second signal path from the second transmitter via the third reflection surface 14 and the fourth reflection surface 15 to the second receiver 11. Between the first transmitter 8 and the first reflection surface 12 is located the first straight subsection of the first signal path. Between the first reflection surface 12 and the second reflection surface 13, the acoustic signal moves along the second straight subsection 17 of the first signal path. Finally, the second reflection surface 13 and the first receiver border the third straight subsection 18 of the first signal path. Equal behavior is found in the case of the second signal path: Between the second transmitter and the third reflection surface 14 is located the first straight subsection 19 of the second signal path; between the third reflection surface 14 and the fourth reflection surface 15 is located the second straight subsection 20 of the second signal path; between the fourth reflection surface 15 and the second receiver 11 is located the third straight subsection 21 of the second signal path. All transmitters and receivers 8 to 11 are, as ultrasonic transducers, operable both as transmitters as well as also as receivers. All reflection surfaces 12 to 15 are arranged in the measuring tube 1. They have, in each case, surface normals (not shown), which are not perpendicular to the measuring tube axis 22. The first signal path and the second signal path extend helically around the measuring tube axis and as mirror images of one another in the measuring tube. Lying in the mirror plane is the measuring tube axis 22. Therefore, all statements made concerning the first signal path hold analogously for the second signal path.

This arrangement offers advantages in the case of non-rotationally symmetric flow profiles and/or especially in the case of flows extending helically around the measuring tube axis. If a flow has a flow profile with directional components extending tangentially to the measuring tube wall and therewith perpendicular to the measuring tube axis, a single helical signal path extending around the measuring tube axis would extend with or counter to these directional components, which could result in a measurement error. With a second signal path extending counter to the first signal path helically around the measuring tube axis and entering into the calculating of the flow with the same weighting, this error is eliminated. The next FIG. provides an alternative to this solution.

The first separation 26 of the first straight subsection of the first signal path from the measuring tube axis is other than zero and other than the second separation 27 of the second straight subsection of the first signal path from the measuring tube axis, which is, in turn, likewise other than zero and other than the third separation 28 of the third straight subsection of the first signal path from the measuring tube axis, which is, in turn, likewise other than zero and other than the first separation 26 of the first straight subsection of the first signal path from the measuring tube axis.

Since there are not a plurality of straight subsections of the first signal path with the same separation from the measuring tube axis, a summing of the values of the lengths of the straight subsections of the first signal path as projected on the measuring tube axis is not appropriate. Here, the first value of the length of the first straight subsection of the first signal path as projected on the measuring tube axis is other than zero and other than the second value of the length of the second straight subsection of the first signal path as projected on the measuring tube axis, and, in turn, the second value of the length of the second straight subsection of the first signal path is other than zero and other than the third value of the length of the third straight subsection of the first signal path as projected on the measuring tube axis, and, in turn, the third value of the length of the third straight subsection of the first signal path is other than zero and other than the first value of the first length of the first straight subsection of the first signal path as projected on the measuring tube axis. The lengths are not shown, for reasons of perspicuity. They have predetermined values, which are ascertained via a predetermined calculational formula as a function of the respective separations of the straight subsections. They correspond here to normalized weighting factors of a comparable multipath, ultrasonic, flow measuring device. They are obtained by method steps as follows:

First, there occurs the selecting of a number greater than one of straight subsections of the first signal path, which have mutually differing distances from the measuring tube axis. This happens analogously to the development of a multipath measuring device. The more measuring paths, respectively subsections, of the first signal path with different distances from the measuring tube axis, the better is the flow profile traversed with measuring paths, respectively subsections, of the first signal path and the more exactly can the flow be determined, since, in the travel time difference principle, the flow velocities are measured and the flow, especially the volume flow, in the measuring tube cross section is extrapolated and can be averaged over a higher number of measuring paths. In the case of the ultrasonic, flow measuring device of the invention, it is necessary, other than in the case of a multipath measuring device, to take into consideration the signal loss from the reflections and, in given cases, disturbances by tube waves, which are body sound waves transmitted via the measuring tube, for example, from the transmitter to the receiver. In the case of too many subsections of the first signal path, there is the danger of too small signal energy of the acoustic signal on the signal path to the receiver. This presents, thus, an optimizing problem between usable signal energy and accuracy.

Then, the distances of the straight subsections from the measuring tube axis are established. This happens, for example, by calculating by means of appropriate methods, such as the Gauss-Jacobi method, or by simple reading from tables, such as indicated, for example, in the above paper of Tresch, Staubli and Gruber.

In a third method step, the values of the lengths of the straight subsections are ascertained as a function of the number of straight subsections with the same separation from the measuring tube axis and the respective separation from the measuring tube axis, here by ascertaining weighting factors for measuring paths of a multipath, ultrasonic, flow measuring device for flow measurement according to a predetermined calculational formula, here, for example, with the Gauss-Jacobi method, as a function of the distances of the measuring paths from the measuring tube axis, which distances from the measuring tube axis are the same as those of the straight subsections. A dividing of the weighting factors by the number of measuring paths with the same separation from the measuring tube axis is logically not required in the illustrated example of an embodiment. If, such as here, the weighting factors are calculated with the Gauss-Jacobi method, respectively read from a table, they are then normalized with predetermined normalizing factors $$k_i = \sqrt{1-\left(\frac{d_i}{D}\right)^2},$$

wherein $d_i$ stands for the distances of the subsections, respectively the measuring paths, from the measuring tube axis and D for the diameter of the measuring tube. The normalizing is naturally only necessary, when the weighting factors have not already been ascertained in a manner required for the invention. The invention solves the problem of weighting the measuring paths, respectively the subsections, with different separations from the measuring tube axis geometrically for determining the flow. To be taken into consideration are, besides the weightings, the values of the projected lengths of the measuring paths and their distances from the measuring tube axis. The Gauss-Jacobi method is based on the assumption that all measuring paths extend in the measuring tube at the same angle to a plane, in which the measuring tube axis lies and which extends orthogonally to the planes, in which, in turn, the individual measuring paths lie. Furthermore, the measuring tube has a circularly round cross section. The distances of the individual measuring paths from the measuring tube axis lead, consequently, to their projected lengths on the measuring tube axis. Correspondingly, the weighting factors must still be normalized with precisely these projected lengths on the measuring tube axis. Since in given cases, two measuring paths have the same separation from the measuring tube axis, and, thus, are taken into consideration twice with the same weighting factor in the flow determination, the obtained value for the projected length of the corresponding subsection of the flow measuring device of the invention must still be divided by two. The number of measuring paths is, thus, naturally to be taken into consideration in the normalizing.

Then, the values of the lengths of the straight subsections with the same distances from the measuring tube axis are established by dividing the results among the respectively provided number of straight subsections with the same distances from the measuring tube axis. Also this step can be omitted here.

If, now, the number of subsections, their distances from the measuring tube axis and their projected lengths on the measuring tube axis are established, the reflection surfaces in the measuring tube are so applied that the acoustic signal on the path from the first transmitter to the first receiver is so reflected on the reflection surfaces that the corresponding straight subsections with the distances and the calculated values of the lengths projected on the measuring tube axis arise.

If a number of subsections of a signal path are provided with the same distance from the measuring tube axis, the values of their lengths projected on the measuring tube axis must naturally be matched. Their sum must be proportional to the, in given cases, normalized weighting factors.

The first separation is selected to be less than the second separation, which, in turn, is less than the third separation. It follows therefrom that here in this example of an embodiment, the first value of the projected length of the first subsection of the first signal path is greater than the second value of the length of the second subsection of the first signal path as projected on the measuring tube axis, which, in turn, is greater than the third value of the length of the third subsection of the first signal path as projected on the measuring tube axis. The first, the second and the third subsections extend, in each case, skew to one another in the measuring tube. Naturally, other reflection surfaces can be provided in the measuring tube, on which the acoustic signal and/or the acoustic signals of the first and/or of the second acoustic signal path are reflected. It is not absolutely required that these have a non-perpendicular surface normal to the measuring tube axis. Also, the acoustic signal can propagate on a signal path sectionally perpendicular to the measuring tube axis in the measuring tube extend, in which case this subsection then has a length projected on the measuring tube axis of value zero. The path of the signal along this subsection does not, however, help for flow measurement by means of the travel-time difference method, but, instead, is utilized, for example, for determining the velocity of sound. In order to compensate twist effects, also here two oppositely extending subsections can be provided. To this point in time, subsections were shown, which exhibited a separation from the measuring tube axis other than zero; this is, however, no feature of the invention. Also, calculating the said weighting factors by means of the Gauss-Jacobi—or the OWICS method is not absolutely required. If other methods for calculating weighting factors for mapping flow conditions in the measuring tube are known, these are likewise applicable to the invention. To be taken into consideration, in given cases, are the values of the projected lengths of the measuring paths and their distances from the measuring tube axis.

FIG. 7 shows another embodiment of the invention. The acoustic signal along the first signal path 6 is radiated into the measuring tube by the first transmitter 8 with a direction vector perpendicular to the measuring tube axis. Along the path to the first receiver 10, it is reflected on five reflection surfaces, in each case, once, before it, again with a direction vector perpendicular to the measuring tube axis, strikes the first receiver 10. Transmitter 8 and receiver 10 can be arranged outside of the measuring tube 1, for example, on its outer wall. Involved is, thus, a clamp-on type, ultrasonic, flow measuring device. Other advantages will become evident from the type of signal guidance along the first signal path. Thus e.g., when the radiation is brought in perpendicularly, the known problem in the case of usual clamp-on systems of the temperature- and/or medium dependence of the angle of incidence is absent.

As also already explained in connection with the other examples of embodiments, an acoustic signal is first sent by the transmitter to the receiver and then from the receiver to the transmitter, in order to obtain a travel-time difference and in order, finally, to ascertain in known manner the flow rate through the measuring tube.

The invention claimed is:
1. An ultrasonic, flow measuring device comprising:
a measuring tube having a straight measuring tube axis;
a transmitter for sending an acoustic signal on a first signal path;
a receiver for receiving the acoustic signal on the first signal path; and
at least a first reflection surface, on which the acoustic signal is reflected at least once on the first signal path, wherein:

the acoustic signal incident on said first reflection surface propagates along a first straight subsection, which has a first separation from said measuring tube axis, wherein:
said transmitter, said receiver and said first reflection surface are so oriented relative to one another and arranged in or on said measuring tube that the acoustic signal on the first signal path from the first transmitter to the first receiver is so reflected on said at least a first reflection surface that the acoustic signal reflected on the first reflection surface propagates on the first signal path along a second straight subsection through said measuring tube;
the second straight subsection has a second separation from said measuring tube axis;
the first separation differs from the second separation; and
the sum of all lengths of all subsections of the first signal path as projected on said measuring tube axis and having the first separation from said measuring tube axis has a predetermined first value, and the sum of all lengths of all subsections of the first signal path as projected on the measuring tube axis and having the second separation from said measuring tube axis has a predetermined second value, said first value differs from said second value, and said first and said second values are other than zero, and a surface normal to the first reflection surface has an angle relative to said measuring tube axis, which is other than 90°.

2. The ultrasonic, flow measuring device as claimed in claim 1, wherein:
said transmitter, said receiver and said first reflection surface are so oriented relative to one another and arranged in or on said measuring tube that the acoustic signal propagates on the first signal path from the first transmitter to the first receiver helically around said measuring tube axis.

3. The ultrasonic, flow measuring device as claimed in claim 1, wherein:
the first and second separations are other than zero.

4. The ultrasonic, flow measuring device as claimed in claim 1, wherein:
the first separation is less than the second separation and, the sum of all values of the lengths of all subsections of the first signal path as projected on said measuring tube axis and having the first separation from said measuring tube axis is greater than the sum of all values of the lengths of all subsections of the first signal path as projected on said measuring tube axis and having the second separation from said measuring tube axis.

5. The ultrasonic, flow measuring device as claimed in claim 1, wherein:
the summing of all values of the lengths of all subsections of the first signal path as projected on said measuring tube axis, which have the same separation from said measuring tube axis, is accomplished with a calculational formula as a function of such separation.

6. The ultrasonic, flow measuring device as claimed in claim 1, wherein:
the first subsection and the second subsection are skewed to one another in said measuring tube.

7. The ultrasonic, flow measuring device as claimed in claim 1, wherein:
at least one other, second reflection surface is included;
said transmitter, said receiver and said first reflection surface and the at least one other, second reflection surface are so oriented relative to one another and arranged in or on said measuring tube that the acoustic signal on the first signal path from the first transmitter is so reflected on the first and on the at least one additional, second reflection surface to the first receiver that the acoustic signal propagates on the first signal path through said measuring tube along at least one additional, third straight subsection;
the third straight subsection has a third separation from said measuring tube axis;
the third separation differs from the first and second separations;
the sum of all lengths of all subsections of the first signal path as projected on said measuring tube axis and having the third separation from said measuring tube axis has a predetermined third value, which differs from the first value and from the second value; and
the third value is other than zero.

8. The ultrasonic, flow measuring device as claimed in claim 1, wherein:
at least one additional, second transmitter for sending an acoustic signal on a second signal path, is included:
said at least one additional, second receiver for receiving an acoustic signal on the second signal path and at least one other, third reflection surface;
the second transmitter, the second receiver and the at least one other, third reflection surface are so oriented relative to one another and arranged in or on said measuring tube that the acoustic signal on the second signal path from the second transmitter is so reflected on the at least one additional, third reflection surface to the second receiver that the acoustic signal propagates through the measuring tube on the second signal path along at least a fourth and at least a fifth straight subsection;
the fourth straight subsection has a fourth separation from said measuring tube axis and the fifth straight subsection has a fifth separation from said measuring tube axis;
the fourth separation differs from the fifth separation;
the sum of all lengths of all subsections of the second signal path as projected on said measuring tube axis and having the fourth separation from said measuring tube axis has a predetermined fourth value;
the sum of all lengths of all subsections of the second signal path as projected on said measuring tube axis and having the fifth separation from said measuring tube axis has a predetermined fifth value;
the fourth value differs from the fifth value; and
the fourth and fifth values are other than zero.

9. The ultrasonic, flow measuring device as claimed in claim 8, wherein:
at least one other, fourth reflection surface, is included:
said second transmitter, said second receiver and said third reflection surface and the at least one other, fourth reflection surface are so oriented relative to one another and arranged in or on said measuring tube that the acoustic signal on the second signal path from the second transmitter is so reflected on the third and on the at least one additional, fourth reflection surface to the second receiver that the acoustic signal propagates on the second signal path along at least one additional, sixth straight subsection through the measuring tube;
the sixth straight subsection has a sixth separation from said measuring tube axis;
the sixth separation differs from the fourth and fifth separations;
the sum of all lengths of all subsections of the second signal path as projected on said measuring tube axis and having the sixth separation from the measuring tube axis has a predetermined sixth value, which differs from the fourth value and from the fifth value; and the sixth value is other than zero.

10. The ultrasonic, flow measuring device as claimed in claim 8, wherein:
the first signal path and the second signal path extend in said measuring tube as mirror images of one another.

11. The ultrasonic, flow measuring device as claimed in claim 1, further comprising:
one or more concave mirrors, on which the first, second, third and/or fourth reflection surfaces are/is arranged.

12. A method for measuring the flow of a medium through a measuring tube having a straight measuring tube axis by means of acoustic signals according to the travel time difference principle, comprising the steps of:
a first acoustic signal on a first signal path from a first transmitter is so reflected on at least a first reflection surface through the measuring tube to a first receiver that the acoustic signal propagates on the first signal path through the measuring tube along at least a first and at least a second straight subsection;
the first straight subsection has a first separation from the measuring tube axis and the second straight subsection has a second separation from the measuring tube axis;
the first separation differs from the second separation;
the sum of all lengths of all subsections of the first signal path as projected on the measuring tube axis and having the first separation from the measuring tube axis has a predetermined first value and the sum of all lengths of all subsections of the first signal path as projected on the measuring tube axis and having the second separation from the measuring tube axis has a predetermined second value;
the first value differs from the second value; and
the first and second values are other than zero.

13. The method as claimed in claim 11, wherein:
pairs of subsections of the first signal path lie opposite one another as mirror images in the measuring tube.

14. The method as claimed in claim 11, wherein:
a second acoustic signal on a second signal path from a second transmitter to at least one additional, third reflection surface is so reflected through the measuring tube to a second receiver that the acoustic signal propagates on the second signal path through the measuring tube along at least a fourth and at least a fifth straight subsection;
the fourth straight subsection has a fourth separation from the measuring tube axis and the fifth straight subsection has a fifth separation from the measuring tube axis;
the fourth separation differs from the fifth separation; and
the sum of all lengths of all subsections of the second signal path as projected on the measuring tube axis and having the fourth separation from the measuring tube axis has a predetermined fourth value and the sum of all lengths of all subsections of the second signal path as projected on the measuring tube axis and having the fifth separation from the measuring tube axis has a predetermined fifth value;
the fourth value differs from the fifth value; and
the fourth and fifth values are other than zero.

15. The method as claimed in claim 13, wherein:
the first and second signal paths lie opposite one another as mirror images in said measuring tube and are weighted equally in the calculating of flow.

16. The method as claimed in claim 13, wherein:
the first and second signal paths can be to coincide by rotation of one about the measuring tube axis.

* * * * *